United States Patent [19]

Boros et al.

[11] 4,266,182

[45] May 5, 1981

[54] COMMON CONTROL WITH FREQUENCY DRIFT COMPENSATION FOR A PLURALITY OF SWITCHING REGULATORS

[75] Inventors: Victor B. Boros, New York, N.Y.; Harry K. Ebert, Jr., Hackettstown, N.J.

[73] Assignee: Bell Telephone Laboratories, Incorporated, Murray Hill, N.J.

[21] Appl. No.: 69,259

[22] Filed: Aug. 24, 1979

[51] Int. Cl.³ .......................................... H02P 13/32
[52] U.S. Cl. ................................. 323/267; 323/283; 323/285
[58] Field of Search ................... 363/80, 124; 323/17, 323/25, DIG. 1; 307/24; 179/16.3 D

[56] References Cited

U.S. PATENT DOCUMENTS

| | | | |
|---|---|---|---|
| 4,034,232 | 7/1977 | LaVenture | 323/17 |
| 4,095,165 | 6/1978 | Boros | 323/17 |
| 4,109,194 | 8/1978 | Miller | 323/17 |
| 4,194,147 | 3/1980 | Payne et al. | 323/17 |

*Primary Examiner*—William H. Beha, Jr.
*Attorney, Agent, or Firm*—Alfred G. Steinmetz

[57] ABSTRACT

A power supply system having a plurality of individual power supplies utilizes a master control to periodically compensate for errors in individual power supplies. The master control is periodically coupled to individual power supplies by multiplexing means to provide compensation signals to counter drifts and errors due to varying circuit parameters therein.

8 Claims, 7 Drawing Figures

COMMON CONTROL WITH FREQUENCY DRIFT COMPENSATION FOR A PLURALITY OF SWITCHING REGULATORS

TECHNICAL FIELD

This invention is concerned with a common control system for a plurality of power supplies. It is specifically concerned with a common controller for a plurality of digitally controlled switching regulators.

BACKGROUND OF THE INVENTION

In many large system applications, a plurality of power supplies, identical to each other, are positioned within close proximity to each other. A large number of circuit features and components may be duplicated in each power supply. These duplicated components are often expensive because of circuit accuracy and stability requirements. For example, a plurality of digitally controlled switching regulators such as disclosed in U.S. Pat. No. 4,095,165, issued to V. B. Boros on June 13, 1978, and assigned to the same assignee as this application, would all utilize a highly stable voltage controlled oscillator or some other type of analog-to-digital converter in order to assure accurate regulation. The cost of the individual regulators may be significantly reduced by using a less expensive voltage controlled oscillator. However, a less expensive voltage controlled oscillator tends to drift in frequency and reduces the precision of regulation of the switching regulator.

It is also frequently desirable to include auxiliary features in each regulator such as alarm circuits or sophisticated feedback systems that are not normally included because of cost.

SUMMARY OF THE INVENTION

Therefore in accord with the principles of the invention, control functions are embodied in a master or central processing unit and are utilized through multiplexing techniques to supply monitoring and/or control functions to a plurality of power supplies. In particular, a common master control circuit utilizes multiplexing techniques to monitor and compensate for internal errors in the operation of several identical switching regulators.

In a specific application of the principles of the invention, a high precision master control circuit is periodically connected with an individual switching regulator to supply compensatory signals to counteract frequency drift of the voltage controlled oscillator therein which would otherwise cause variations in the regulated output voltage. Specifically, the common control circuit includes a very accurate voltage controlled oscillator which is operated in a digital feedback control connected in parallel with the feedback control of a selected switching regulator. The parallel operation of the master control and the individual control functions to alter the reference count utilized by the individual switching regulators to compensate for frequency drifts in the individual voltage controlled oscillators.

BRIEF DESCRIPTION OF THE DRAWINGS

An understanding of the invention may be ascertained by reading the specification below describing in detail a control circuit arrangement embodying the principles of the invention and which is shown on the accompanying drawings wherein.

DETAILED DESCRIPTION

Figure 1:
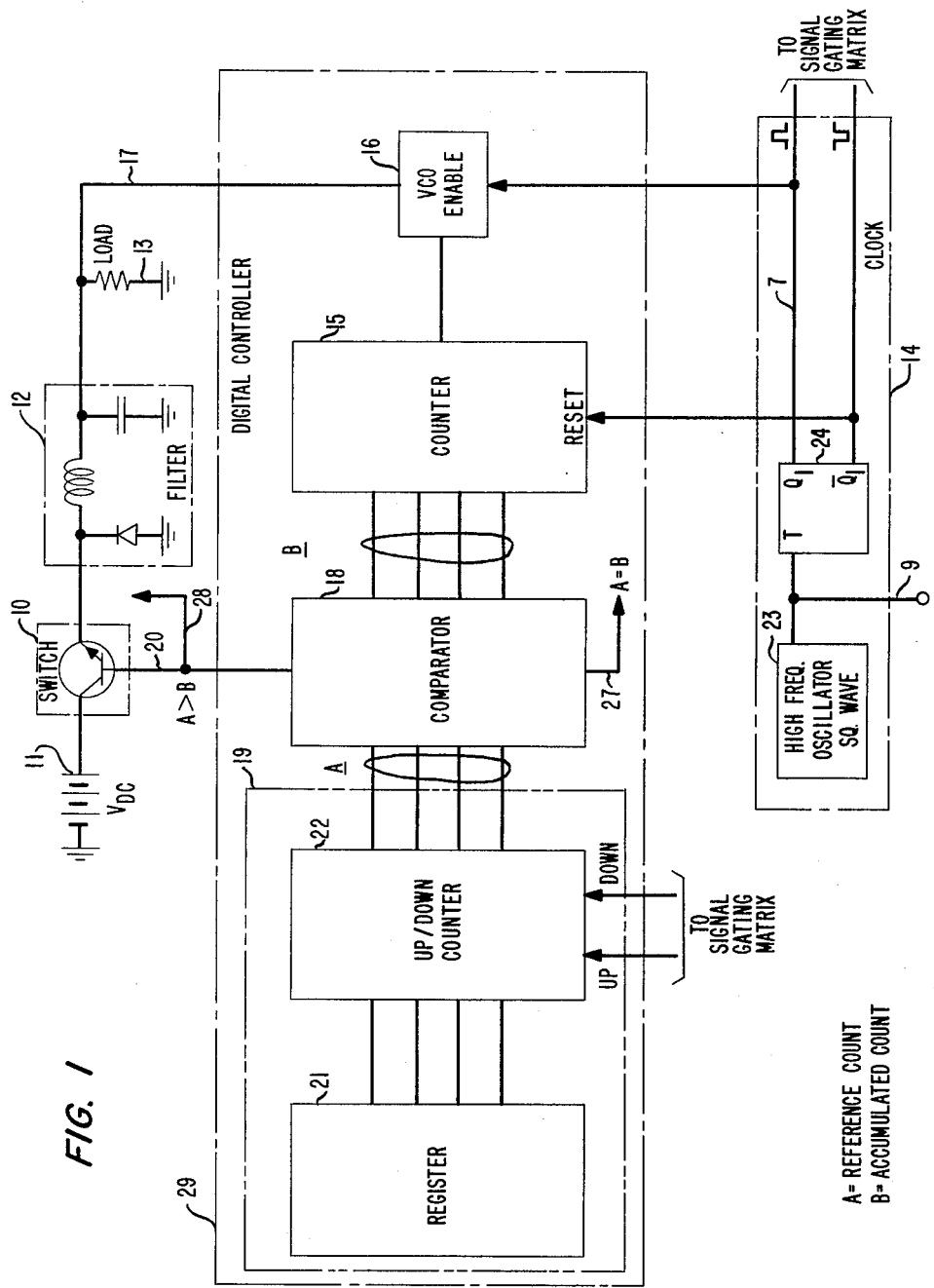
FIG. 1 discloses a digitally controlled switching regulator utilized in the present invention.

A digitally controlled regulator disclosed in FIG. 1 is suitable for operation in conjunction with a multiplexed central digital control system. Switch 10 periodically conducts to couple a DC voltage source 11 via a filter 12 to an output load 13. The duty cycle of the switch 10 determines the magnitude of the output voltage. A periodic cycle of operation is determined by a clock circuit 14 which resets a counter 15 at the beginning of each switching cycle, and also enables a voltage controlled oscillator 16 to respond to the output voltage of the regulator.

The frequency of the voltage controlled oscillator 16 is determined by the magnitude of the output voltage sensed via lead 17. Counter 15 counts the output pulses of the voltage controlled oscillator 16 and applies the accumulating count to a comparator circuit 18. Also connected to the comparator circuit 18 is a reference count source 19 which is preset to a reference count. The increasing count of the counter 15 is continuously applied to the comparator 18 which responds when the continuously increasing generated count equals the reference count.

An output 20 of the comparator 18 is applied to control the switch 10 in a conducting condition as long as the reference count A exceeds the accumulating count B (i.e., $A > B$) generated in response to the voltage controlled oscillator 16 and in a nonconducting condition when the accumulating count B equals and exceeds the reference count A (i.e., $A \leq B$). As soon as the count of the voltage controlled oscillator 16 equals the reference count, the output 20 of the comparator 18 changes state and the switch 10 is rendered nonconductive. Clock 14 resets the counter at the termination of the periodic cycle in preparation for a subsequent cycle of operation.

As shown in FIG. 1, the reference count source 19 includes a register 21 coupled to comparator 18 through a count modifier circuit 22. Count modifier 22, embodied as an up/down counter, modifies the reference count to achieve desired control objectives. It has the capacity to either pass the reference count of the register 21 to the comparator unchanged or to modify it in response to up/down control signals applied thereto.

Count modifier circuit 22 is used herein to achieve the common control objectives of a master control coupled to the individual regulators through multiplexing circuitry. In a specific example discussed hereinbelow, a reference count of register 21 is altered via count modifier 22 to compensate for frequency drift in the voltage controlled oscillator 16 of the individual regulators. If the voltage controlled oscillator 16 of an individual regulator drifts in frequency, the regulated output voltage will vary because the duty cycle of the switch 10 is altered; hence, a central control modifies the reference count to restore the original duty cycle in order to compensate for this frequency drift.

Figure 2:
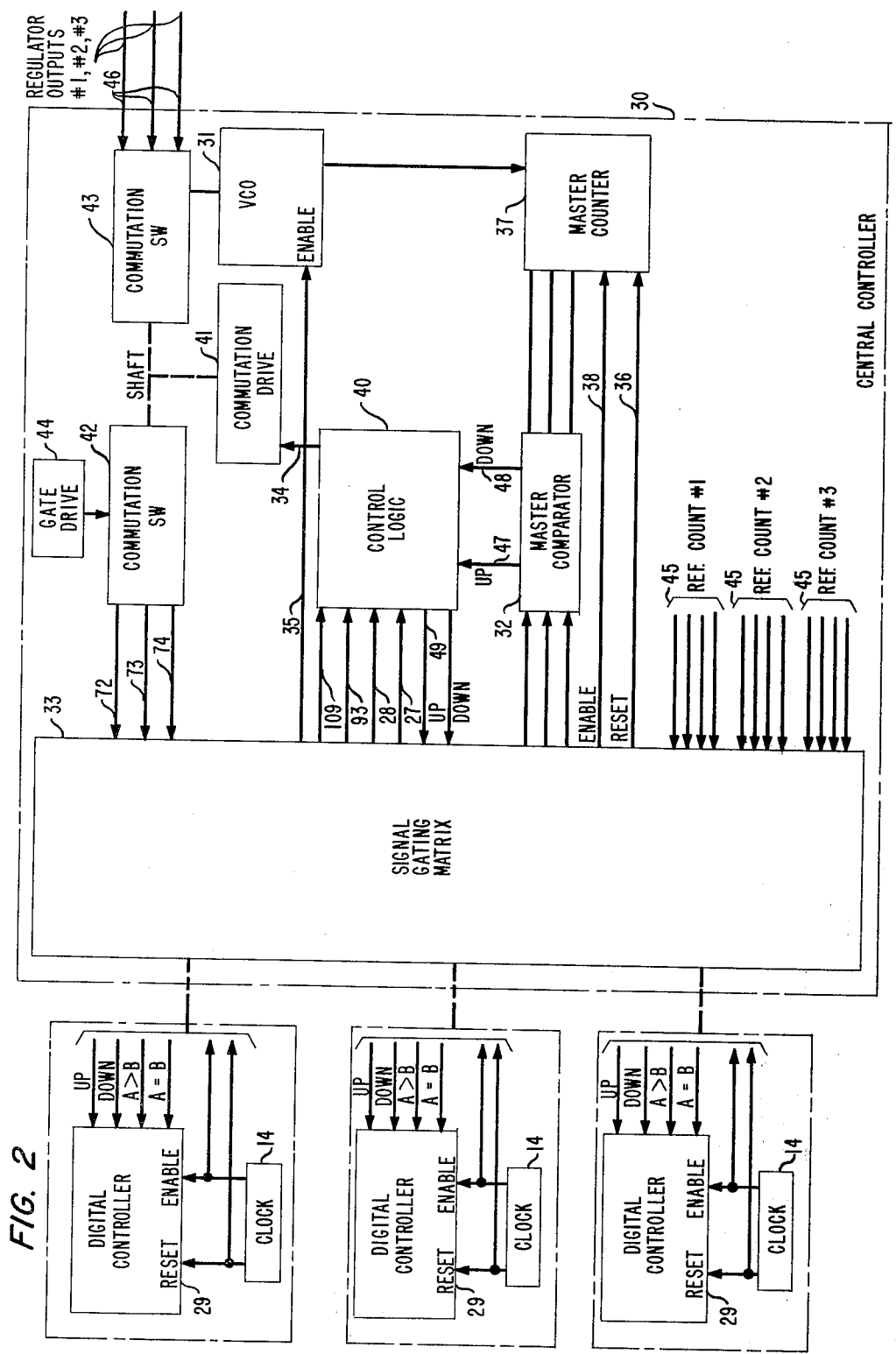
FIG. 2 discloses a coupling of individual control circuits of individual regulators with a master control circuit according to the principles of the invention.

A central controller 30, shown in block form in FIG. 2, is operative to alter reference counts in an individual regulator in order to compensate for frequency drift in the individual voltage controlled oscillator 16 therein. It applies a master control signal to individual digital controllers 29 via multiplexing techniques to either increment or decrement a reference number therein.

Central controller 30 includes a master voltage controlled oscillator 31 and a master comparator circuit 32. A signal gating matrix 33 couples the reference count of a selected or multiplexed digital controller 20 of a particular switching regulator to the master comparator 32. A count output of the master voltage controlled oscillator 31 is compared therein with the count output of a voltage controlled oscillator 16 of an individual switching regulator. In response to this comparison, the count modifier 22 of the individual switching regulator is commanded to either increment, decrement, or leave unchanged the individual reference number of that particular switching regulator.

Clock 14 of each individual switching regulator, as shown in FIG. 1, comprises a high frequency squarewave source 23 driving a monostable circuit 24. Monostable circuit 24 generates a short timing pulse and a complementary pulse. These are utilized to temporarily disable the voltage controlled oscillator 16 and reset the counter 15 respectively. These two pulses are applied by the individual clocks 14 to the signal gating matrix 33, which sequentially couples these pulses, via leads 35 and 36 to master VCO 31 and master counter 37 for the purpose of synchronizing operations of the master controller with the individual digital controllers 29.

Master comparator 32 continuously compares the output of master counter 37 with the reference count of an individual digital controller 29 to which it is coupled. The switching control output of the individual comparator 18 on lead 28 (FIG. 1) is coupled by the signal gating matrix 33 to a control logic circuit 40. When the reference count equals an accumulating count in the individual digital controller, the output of the comparator 18, on lead 28, applied to the control logic 40, enables transmission of the output of the master comparator control signal to be applied, via the signal gating matrix 33, to the count modifier 22 of the individual digital control in order to increase, decrease or leave unchanged the individual reference count.

It is apparent from the foregoing that the switch control output signal of comparator 18 of each of the individual digital controllers is coupled, via the signal gating matrix 33 to counter 37 and control logic 40 included in the central controller 30. Control logic 40 controls gating in the switching matrix 33 to couple the output of the master comparator to the individual digital controller to increment or decrement the count modifier 22. It is readily apparent that a frequency drift in the individual controlled oscillator due to an altered voltage-to-frequency transfer slope is compensated for by altering the reference count.

The central controller includes two commutating switches 42 and 43 having a common shaft and driven by a commutator drive 41. The first commutating switch 42 couples a gate drive signal source 44 to selected gates in the signal gating matrix 33 in order to multiplex the central controller to the individual controllers in a prearranged sequence. The second commutating switch 43 sequentially connects the voltage outputs of individual voltage regulators sensed on leads 46 to the master VCO 31.

Signal gating matrix 33 connects individual reference counts on lead 45 of the individual regulators to master comparator 32 wherein the master voltage controlled oscillator generated count is compared with the individual reference count of the individual regulator. Control logic 40 functions to couple the up/down control signal outputs on leads 47 and 48 of the master comparator 32 to the particular digital controller 29 connected thereto by the signal gating matrix 33 in oder to increment or decrement the count modifier 22 included therein.

Figure 3:
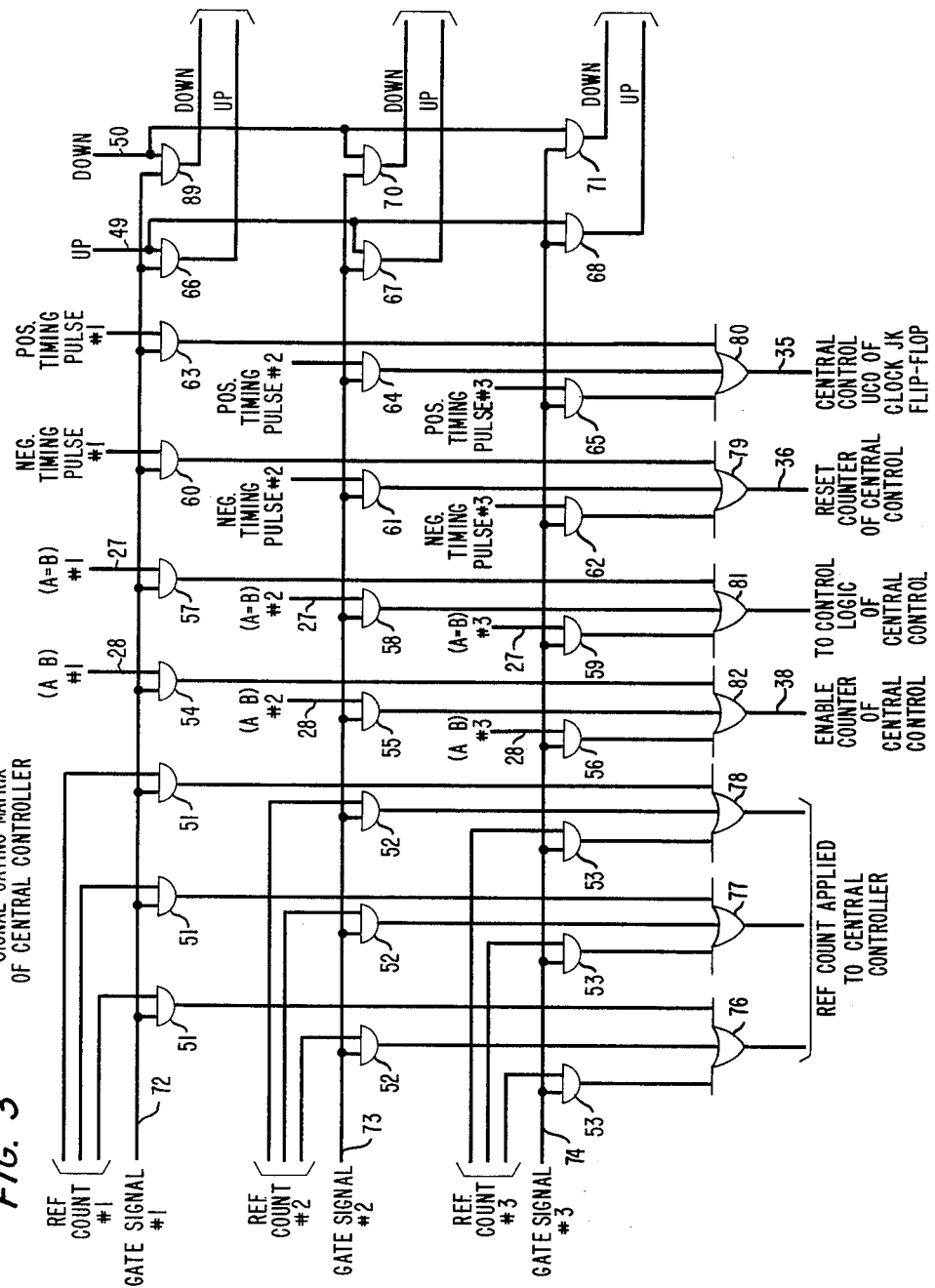
FIG. 3 discloses a signal gating matrix for appropriately coupling control signals from a master control circuit to the individual control circuits.

A signal gating matrix disclosed in detail in FIG. 3 includes a matrix of signal transmission gates 51-71 which are operative for the purpose of coupling control signals and information signals to and from the master control circuitry with individual digital controllers of the individual switching regulators. The signal gates therein are symbolically shown as AND gates; however, many appropriate equivalent signal transmission gates may be used.

Operation of the signal gating matrix 33 is readily apparent to those skilled in the art. The gates 51-71 are arrayed in rows and columns. The gating signals generated by gate drive 44 and commutated by switch 42 are applied on leads 72, 73, and 74 to sequentially enable successive rows of the gates 51-71.

Reference counts from the three individual digital controllers 29 in the example are applied to selected groups of these gates 51, 52, and 53. Reference counts in the example herein are shown as three digit numbers and are applied to a group of three gates which are simultaneously enabled by a gate signal. The reference count transmitted by a group of gates is coupled through the OR gates 76, 77, and 78 to the master comparator 32 of the central controller. Similarly timing pulses generated by the individual clocks 14 of the individual switching regulators are coupled to AND gate pairs 60, 63; 61, 64; and 62, 65 which are enabled by the gating signals on leads 72, 73, and 74. The gate output signals are connected by OR gates 79 and 80 to reset the master counter 37 and temporarily disable the master voltage controlled oscillator 31 of the central controller in order to synchronize their operation with the individual digital controllers 29. Switch drive signals generated by the individual comparators representing the comparative state of the reference and accumulating counts are coupled via AND gate pairs 54, 57; 55, 58; and 56, 59 and subsequently by OR gates 81 and 82 to the control loic 40 of the central controller and to an enable input 36 of the master counter 37.

Up/down control signals generated by the master comparator 32 are coupled via leads 49 and 50 to AND gate pairs 66, 69; 67, 70; and 68, 71. The enabled AND gate pair couples an up/down signal to the appropriate counter modifier 22 in the digital controller 29.

It is readily apparent that an exchange of information and control signals is synchronously coupled from the master controller to the individual digital controllers of the individual switching regulator under the command of the gating signals applied to leads 72, 73, and 74. Furthermore individual gating signals are generated by the control logic circuit 40 shown in detail in FIG. 4, to synchronize the operations of the master and individual controls and also to prevent the generation of simultaneously conflicting information signals.

Figure 4:
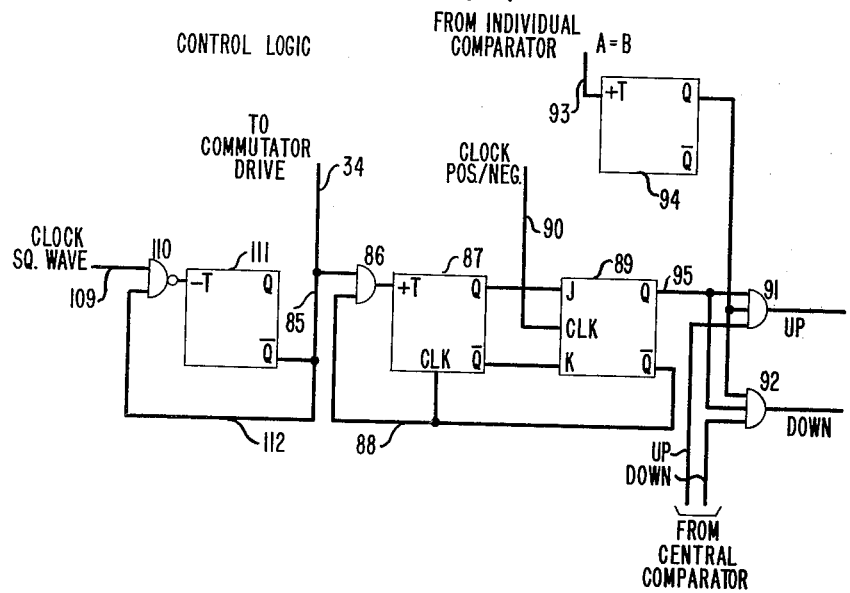
FIG. 4 discloses a timing circuit to synchronize operation of the master control circuit with the individual control circuits.
Figure 5:
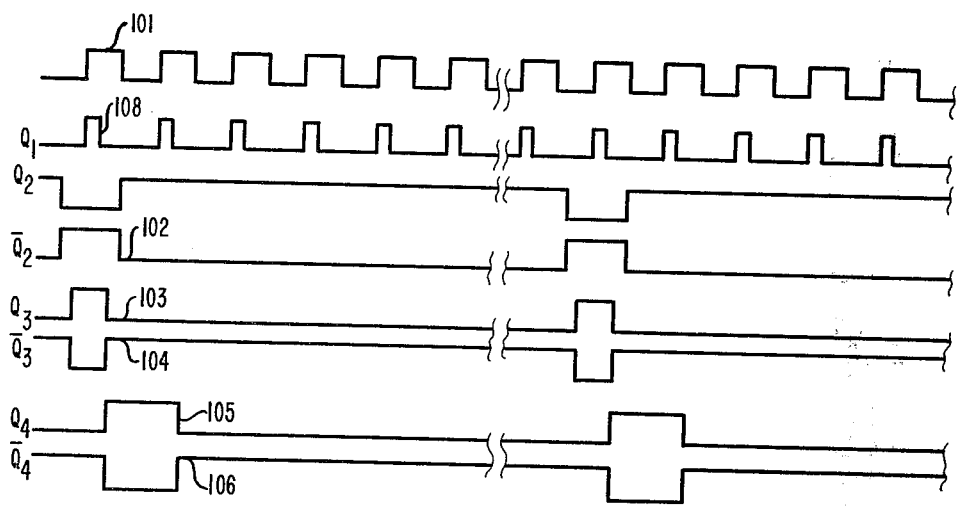
FIG. 5 discloses voltage waveforms to describe the operation of the timing circuit of FIG. 4.

Operation of the control logic circuit may be readily understood by referring to the block diagram in FIG. 4 and the accompanying voltage waveforms in FIG. 5. As described above, an oscillator 23, in each of the clocks 14 associated with the individual switching regulators, generates a squarewave shown as voltage waveform 101 in FIG. 5. Squarewave waveform 101 is applied to a monostable circuit 24 in the individual clock 14 which generates positive timing pulses shown as voltage waveform 108 in FIG. 5. Waveform 101 appears on the clock output lead 9 in FIG. 1 and is coupled through the gating matrix 33 to the input lead 109 of the control logic circuit of FIG. 4.

Input lead 109 is applied to NAND gate 110. A feedback lead 112 is also coupled to the input of NAND gate 110 and serves to couple the complementary output of monostable circuit 111 shown as waveform 102 to NAND gate 110. When this signal on lead 112 is low, it operates to block transmission of signals on lead 109 through NAND gate 110 to prevent retriggering of the monostable circuit 111 once it has been triggered until the internal timing of monostable circuit 111 causes it to reset. This protection is necessary since subsequent retriggering of monostable circuit 111 would otherwise never permit it to reset.

This complementary output signal of monostable circuit 111 is applied via lead 85 to an AND gate 86 and also via lead 34 to the commutator drive to activate stepping action therein. A positive pulse of voltage waveform 102 is transmitted by the AND gate 86 to the positive trigger input of monostable circuit 87. AND gate 86 is enabled to transmit this signal by a feedback signal supplied on lead 88 from the complementary output of the J-K Flip Flop 89. In a starting condition, the J-K Flip Flop normally supplies a signal to enable AND gate 86 because the monostable circuit 87 in its reset state applies the proper J-K signals to the J-K inputs of the J-K Flip Flop 89 so that its output state provides the proper signal output on lead 88 to enable AND gate 86.

The positive pulse of waveform 102 triggers monostable circuit 87. In its set state, the monostable circuit 87 applies signal states representing a one and zero to the J-K inputs of the J-K Flip Flop 89, respectively. The clocking pulse to trigger the J-K Flip Flop is supplied by the monostable circuit 24, as shown in FIG. 1 (Lead 7). The clocking pulse is shown in FIG. 5 as voltage waveform 108. This clocking signal is applied via lead 90 to the clock input of J-K Flip Flop 89. The normal output of J-K Flip Flop 89 is applied via lead 95 to control transmission through AND gates 91 and 92 which couples up/down control signals from the central comparator to the signal gating matrix. This enabling signal on lead 95 is shown in FIG. 5 by voltage waveform 105 and as shown therein, occurs periodically with the period of reoccurrence being determined by the timing delay established by the monostable circuit 111. This gating enabling signal, however, is synchronized with the clock pulse output of the individual switching regulator with which the logic control circuit is coupled by the switching matrix 33.

Monostable circuit 87 has its normal and complementary outputs shown by waveforms 103 and 104 coupled to the J-K inputs of J-K Flip Flop 89. Monostable circuit 87 sets the J and K values, and the clock triggering pulse shown by waveform 108 on lead 90 synchronously changes the output state of the J-K Flip-Flop 89 in accordance with the J-K inputs. The output states of the J-K Flip-Flop 89 supply pulse signals, shown by waveform 105, which are applied to AND gates 91 and 92 to establish time duration windows in which the up/down signals generated by the central controller may be transmitted to the individual count modifiers of the individual digital control circuits.

A second signal responsive to equalization of the reference and accumulating counts (A-B) in the individual comparator circuits (see lead 27, FIG. 1) is applied to lead 93 to trigger monostable circuit 94 whose output supplies an enabling signal to the AND gates 91 and 92. This second signal ensures that up/down signals are withheld from the individual digital controller until the conducting interval of its switch for that particular cycle is established thereby preventing undesirable transient conditions.

The up/down signal output of the AND gates 91 and 92 is applied to the signal gating matrix of FIG. 3 and is coupled via the enabled pair of the signal AND gate pairs 66, 69; 67, 70; and 68, 71 to the appropriate individual digital controller 29 as determined by the gating signal output of the commutating switch 42.

While the aforedescribed control system has been described with a reference to compensating for frequency drift of the individual voltage controlled oscillators 16, other functions may be accomplished through identical multiplexing techniques within the spirit of the invention herein described.

Figure 6:
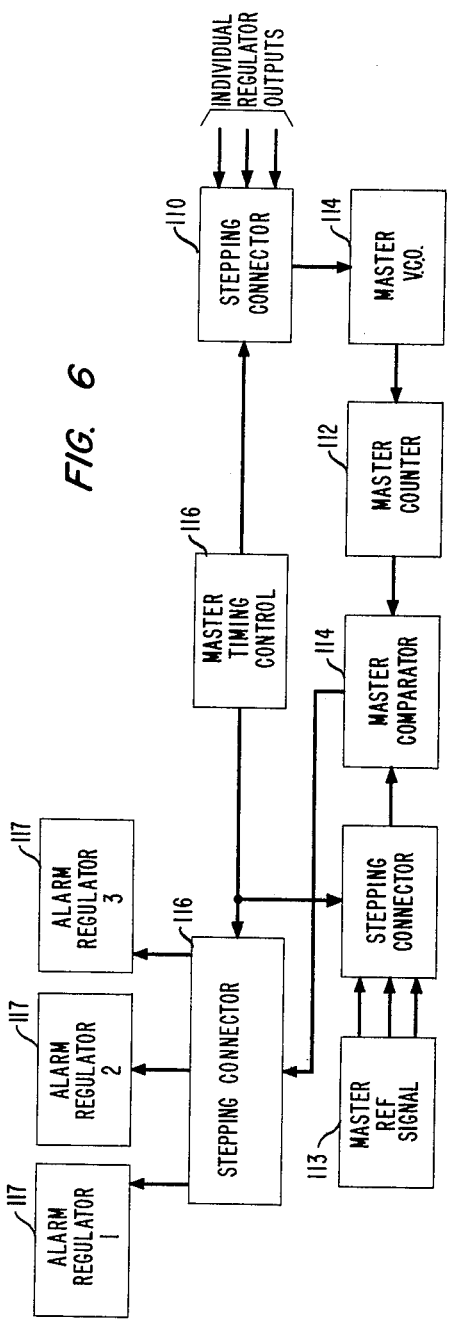
FIG. 6 discloses a master alarm control multiplexed with a plurality of switching regulators.
Figure 7:
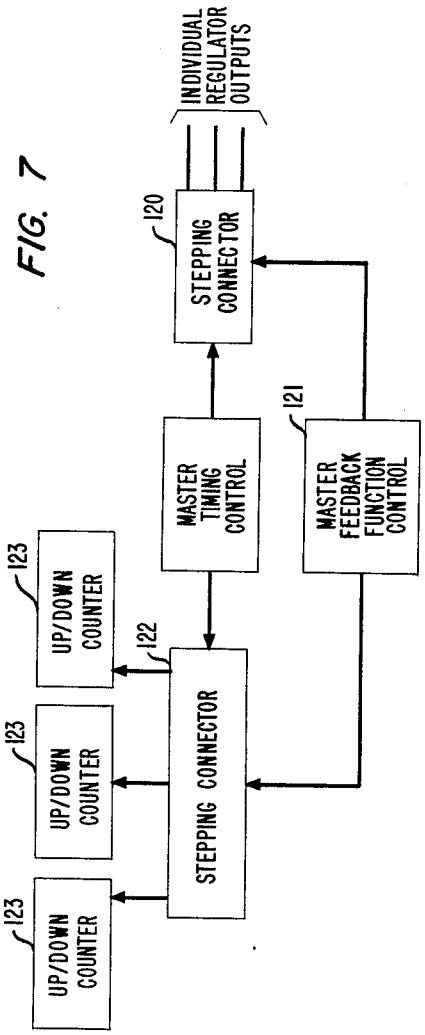
FIG. 7 discloses a master auxiliary feedback circuit multiplexed with a plurality of switching regulators.

Frequently it is desirable to have an alarm indicator in a power supply to indicate an overlimit condition. The alarm system shown in block form in FIG. 6 discloses an alarm arrangement which may be utilized to determine overvoltages or overcurrents in a plurality of power supplies. Signal outputs of the individual power supplies are sequentially coupled by a stepping connector 110 to a master voltage controlled oscillator 111 which drives a master counter 112. A master overlimit reference count register 113 containing a plurality of reference counts associated with individual regulators is coupled via a stepping connector 111 and with counter 112 to a master comparator 114. Master comparator 114 compares the accumulated count with the applicable overlimit reference count. As long as the switching regulators operate below the limit defined by the applicable overlimit reference count, the count of the master counter 112 never achieves a value sufficient to compare with the master overload count. If such a count is obtained, master comparator 114 applies an alarm signal to stepping connector 115 which under control of the master timing control 116, applies the alarm signal to an alarm indicator 117 of the appropriate switching regulator.

The multiplexed master control principle may be utilized to couple sophisticated feedback functions periodically to individual switching regulators. For example, it may be desirable to periodically couple a gain differentiation or error integration feedback function to the individual regulators to improve static or dynamic responses of the individual regulator controls. In this instance, the individual regulator signal outputs are applied through the stepping connector 120 to a master feedback function control 121 which in turn is applied to a synchronized stepping connector 122 applying it to the appropriate up/down counters 123 of the selected individual regulators. Many other varied examples of centralized master control will readily suggest them-

I claim:

1. A power supply system including at least a first and second switching regulator having a first and second regulatory control circuit including first and second error signal generating circuitry, respectively;
   wherein the improvement comprises;
   a master regulatory control circuit including a master error signal generating circuit;
   multiplexing means to periodically and sequentially couple the master regulatory control circuit to the first and second switching regulator; and
   first and second compensation circuits each responsive to the master error signal generating circuit and each operative to modify an erro signal generated by the first and second error signal generated by the first and second error signal generating circuitry respectively wherein the precision of operation of the first and second switching regulator is enhanced.

2. A power supply system as defined in claim 1 wherein;
   said first and second error signal generating circuits comprise a first and second amplitude-to-frequency converter respectively and first and second counting means for counting a frequency and said master error signal generating circuit includes a master amplitude-to-frequency converter and master counting means for counting a frequency.

3. A power supply system as defined in claim 2 wherein
   the first and second compensation circuits each includes a first and second count modifying means to alter a reference count with which the first and second counting means is compared.

4. A power supply system as defined in claim 3 wherein;
   said multiplexing means comprises a matrix array of signal transmission gates periodically enabled to couple the master regulatory control circuit to the first and second count modifying means.

5. A power supply system as defined in claim 1 wherein;
   said master regulatory control circuit includes a master timing control to synchronize operation of the master regulatory control circuit with the first and second regulatory control circuit.

6. A power supply system comprising;
   at least a first and second regulator circuit, each including first and second error signal generation means and first and second error signal modifying means;
   a master control circuit including;
   sensing means for sampling an output of the first and second regulator circuit;
   master error signal generation means responsive to the sensing means and a reference signal for generating an error signal;
   master comparison means for comparing error signals of the first and second error signal generation means with an error signal of the master error signal generation means and generating a correction signal; and
   multiplexing means for periodically and sequentially coupling the first and second error signal generation means to the master comparison means and the correction signal to the first and second error signal modifying means.

7. A power supply system as defined in claim 6 wherein;
   the master control circuit further includes out-of-limit detection means and the first and second regulator each include first and second out-of-limit alarms, the multiplexing means coupling an out-of-limit signal to the first and second out-of-limit alarms in response to an out-of-limit condition.

8. A power supply system as defined in claim 6 wherein;
   the master control circuit includes specialized feedback function means responsive to samples of an output of the first and second regulator detected by said sensing means and said multiplexing means periodically and sequentially coupling the feedback function to the first and second regulators.

* * * * *